Nov. 2, 1926.
T. M. CHANCE
1,605,171
METHOD AND APPARATUS FOR MEASURING THE SPECIFIC GRAVITY OF
LIQUID AND SOLID MIXTURES
Filed July 26, 1924     2 Sheets-Sheet 1
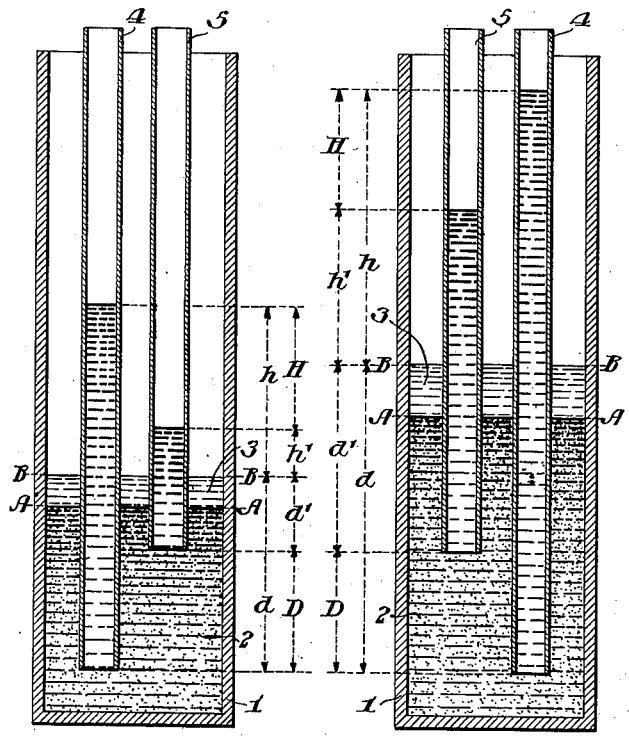
FIG.I.     FIG.II.
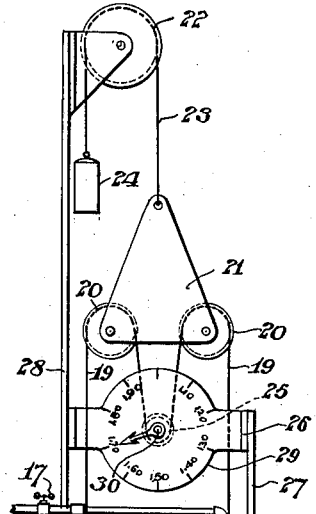
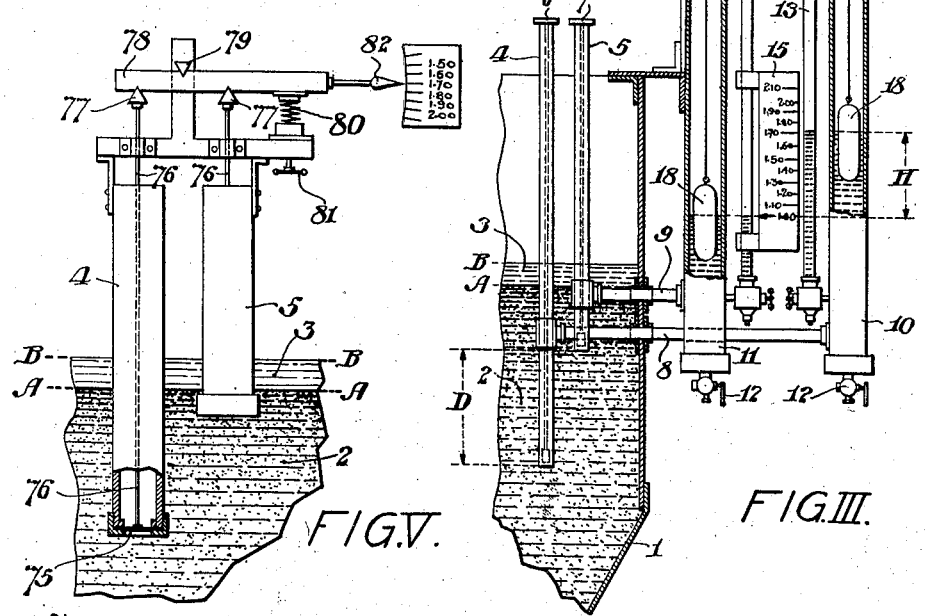
FIG.V.     FIG.III.
Witnesses:     Inventor
Carl K. Schulze     Thomas M. Chance
Frank H. Mills

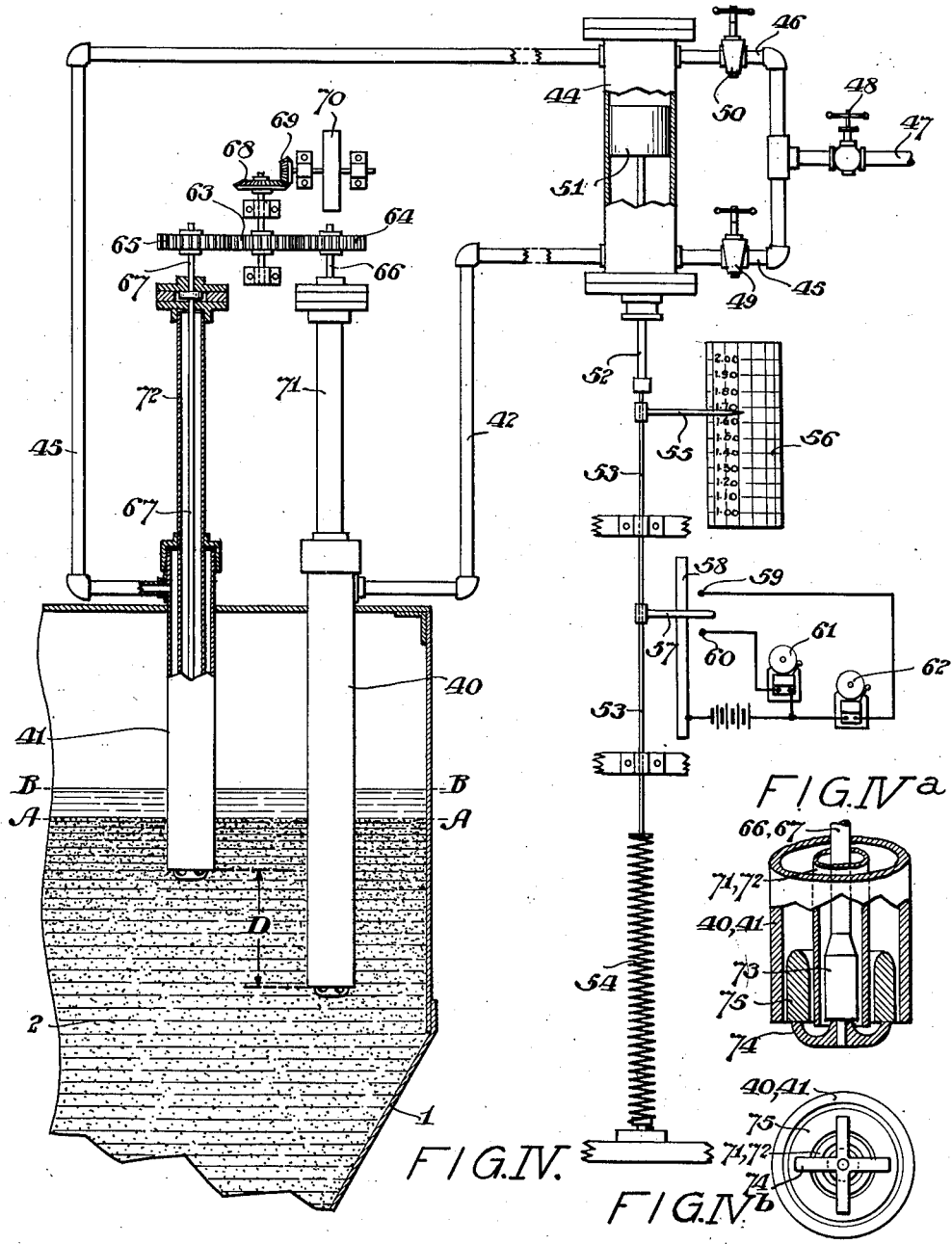

Patented Nov. 2, 1926.

1,605,171

UNITED STATES PATENT OFFICE.

THOMAS M. CHANCE, OF PHILADELPHIA, PENNSYLVANIA.

METHOD AND APPARATUS FOR MEASURING THE SPECIFIC GRAVITY OF LIQUID AND SOLID MIXTURES.

Application filed July 26, 1924. Serial No. 728,416.

My invention relates to the measurement of the specific gravity of mixtures of solids and liquids such as maintained suspensions of solids in liquids, and "fluid masses" such as I have described in Patents Nos. 1,224,138, issued May 1, 1917, 1,392,399, issued October 4, 1921, and 1,462,881, issued July 24, 1923.

If the lower portion of a glass tube, held in a vertical position, be immersed in such fluid mass, the fluid mass will fill the tube to a level coinciding with the top of said fluid mass, but the suspended solids in the fluid mass within the tube immediately begin to settle and in a short time all of the said solids will fall out of the tube, the tube containing nothing but water or such solution or other liquid which may be the liquid constituent of the fluid mass. Coincident with the falling of the solid particles from the tube water enters the lower end of the tube and the tube becomes filled with water (or other liquid) to a higher level than the surface of the fluid mass outside the tube. The distance or height to which the water rises in the tube above the level of the fluid mass is directly proportional to the depth to which the tube is immersed in the fluid mass and also directly proportional to the increase in the specific gravity of such fluid mass above that of the water or other liquid due to the presence of its solid constituent, and the weight of that part of the column of water in the tube above the level of the fluid mass is equal to the weight of the solids in a cylindrical column of the fluid mass such as could be contained in said tube and of a length equal to the depth to which the tube is immersed in the fluid mass. For example, if the tube be immersed to a depth of 10 inches in an aqueous fluid mass having a specific gravity of 2.00 the water will rise in the tube to a height of 10 inches, if the specific gravity be 1.50, to a height of 5 inches, if the specific gravity be 1.00 to a height of zero. The specific gravity of the fluid mass is $$1 + \frac{h}{d},$$

where $h$=height to which liquid rises and $d$=depth of immersion of the tube in the fluid mass.

The total height to which such column of water rises, if measured from the bottom of the tube, directly measures the hydraulic pressure produced by the fluid mass at the depth of immersion. It is therefore evident that such pressure, and the specific gravity can be measured in exactly the same way by a tube external to the receptacle containing the fluid mass, the pressure being transmitted through a connection made at any desired point through the walls of the container, or by any form of pressure gauge by which the pressure developed at a certain depth of such fluid mass can be measured. If, however, the upper surface of the fluid mass is not maintained at a constant level, or if a body of liquid of constant or variable depth be superposed upon said fluid mass as described in said Patent No. 1,392,399, the specific gravity cannot be determined by a single tube, or by the pressure at a single point, except by the use of auxiliary means for determining the level of the top of the fluid mass and the depth of water superposed thereon, and making corrections for these variables.

I overcome these latter difficulties by utilizing the differences in pressure produced at two points in said fluid mass, said points being separated by a definite vertical interval, the difference in pressure at these two points being a measure of the specific gravity of the fluid mass in this vertical interval. When using this method, the total pressure caused by variations in the level of the top of said fluid mass and in the depth of said superposed water or other liquid, will produce equal variations in pressure at the two points at which the total pressures are to be measured, and the difference in pressure at the two points will always be directly proportional to the vertical distance between said two points and to the weight of the suspended solids in this vertical interval, and this difference in pressure can therefore be used to determine the specific gravity by the formulæ

$$\text{specific gravity} = 1 + \frac{h-h'}{d-d'},$$

where $h$=height or pressure recorded for the point of greatest immersion or lower point, $h'$=that at least immersion or higher point, $d$=depth of immersion at the lower point and $d'$=depth of immersion at the higher point in said fluid mass.

Many different types of apparatus for the measurement of this difference in the pressures developed at the two fixed points, may be designed by those skilled in the art of measuring pressures. I therefore intend the drawings to illustrate diagrammatically variations in types of apparatus such as may be used in carrying out my invention.

The foregoing description of the principles upon which my invention is based is illustrated by the diagrams Figs. I and II which are vertical cross-sections of a container holding a fluid mass of the described type with a body of liquid superposed upon the fluid mass, the depth of fluid mass being variable and the depth of the superposed liquid also being variable, the drawings illustrating the measurement of the specific gravity by the difference in pressure at two points in said fluid mass separated by a fixed vertical interval. The drawings do not show the means by which the fluid mass is agitated as that is fully described in the said patents.

Fig. III is a vertical cross-section showing a specific gravity indicator applied to a fluid mass of the described type composed of sand and water, in which agitation is effected mainly by slowly rising water introduced near the base of the apparatus, the drawing showing a part of an apparatus such as is used in washing anthracite coal at several places in the State of Pennsylvania, together with a specific gravity indicator having the pressure measuring tubes inside the coal separating receptacle, while the indicators and gauges are outside the receptacle. The drawing shows means for directly measuring the difference in height of the water in two gauge glasses by a movable scale and also shows an automatic visual specific gravity indicator using a dial and moving hand or pointer to continuously show the specific gravity.

Fig. IV is a vertical cross-section and elevation of a specific gravity indicator applied to the same type of apparatus as described for Fig. III in which the pressures at the two fixed depths are transmitted, by air under compression equal to the said two pressures, to an indicator, recording apparatus and annunciator system.

Fig. IV$^a$ is an enlarged vertical cross-section and Fig. IV$^b$ a bottom view of the lower part of the tubes shown by Fig IV.

Fig. V illustrates the use of flexible diaphragms attached to means for measuring the difference in the pressures exerted upon them.

In Figs. I and II the tank 1 is partly filled with an agitated fluid mass 2 of the described type, with a superposed body of liquid 3, the top of the fluid mass being designated by the line A—A and the top of the liquid by the line B—B. The fluid mass used for this illustration is assumed to have a specific gravity of 2.00 and the liquid (water) to have a specific gravity of 1.00, but the drawings illustrate the operation with any fluid mass whose specific gravity is twice that of the liquid used. In each of the drawings two tubes 4 and 5 are placed in the same relative vertical position in the tanks 1, 1 but in Fig. II lines A—A and B—B are higher than in Fig. I. The drawings show that the difference in the level to which the liquid (water) rises in tubes 4 and 5 measures the increase in the specific gravity over that of water in both cases. In the drawings the distance D is the difference in depth of immersion of the two tubes 4 and 5 and H is the difference in the height to which water rises in the two tubes; $d$ is the total depth of immersion of the longer tube, $d'$ the depth of immersion of the shorter tube, $h$ the height to which liquid (water) rises in the longer tube and $h'$ the height to which it rises in the shorter tube. Hence $$\text{sp. gr.} = 1 + \frac{h-h'}{d-d'} = 1 + \frac{H}{D}.$$

If the tubes 4 and 5 were both immersed in the fluid mass to the same depth below the water line B—B, water would rise to the same height in both tubes; if then one of the tubes be lowered to greater depth the additional height to which water rises in that tube will measure the increased hydrostatic pressure at the base of the lower tube, and this increased pressure will measure the increase in density due to the presence of the solid constituent of the fluid mass. If the depth of the superposed body of liquid (water) be known, calling this depth W, the specific gravity can be calculated thus:

$$\text{sp. gr.} = \frac{d+h-W}{d-W},$$

or $$\text{sp. gr.} = \frac{d'+h'-W}{d'-W}.$$

In Fig. III the agitated fluid mass 2, with superposed water 3, is shown by a cross-section of a portion of a coal separating tank 1, the solid constituent being sand, the liquid water and the specific gravity of the fluid mass is assumed to be 1.70. Two tubes 4 and 5 immersed to different depths in 2, are provided with clean-out rods shown by dotted lines and having enlarged heads 6 and 7, the rods extending to the bottom of the tubes. These rods have an enlargement at their lower ends so that there is but a small clearance between the rod and the inside of the tube in order to prevent the entrance of coarse material into the tubes. These rods are preferably made so that they can be rotated in order that there may be unobstructed passage for water at all times between the rods and the inside of the tube. The construction of and a means for rotating such clean-out rods is illustrated in Figs. IV, IV$^a$ and IV$^b$. Pressure developed in tubes 4 and 5 is transmitted through connections 8 and 9 to two vertical pipes 10 and 11 in which water therefore can rise to a height dependent upon the pressures developed in 4 and 5. These pipes 10 and 11 are closed at the bottom but are provided with clean out cocks 12. The pipes 10 and 11 are equipped with gauge glasses 13 and 14 open at the top, mounted upon and in communication with 10 and 11 through gauge glass fittings as shown by the drawing. The water in 10 and 11 is therefore free to rise in these gauge glasses 13 and 14 to a height equal to its height in 10 and 11. A specific gravity scale 15 is slidably mounted on gauge glass 14, on the gauge glass guard rods, or in other suitable manner, so that it can be moved vertically to bring the 1.00 specific gravity mark level with the water in 14, the scale then showing the specific gravity by the graduation which is level with the water in gauge glass 13. It is found advantageous to have a continuous flow of clean water flowing from pipes 10 and 11 through 8 and 9 into 4 and 5, so that a slowly moving current of water is continuously flowing out of the lower ends of tubes 4 and 5, decreasing the tendency of sand to find its way up into these tubes, and facilitating the dropping out of any sand that may enter. Periodic or continuous rotation of the clean-out rods in these tubes also facilitates the removal of sand and other foreign matter. To provide clean water for this purpose a valved water supply pipe is shown by 17 provided with outlet nozzles which feed an equal quantity of water into each of the pipes 10 and 11. The quantity of water supplied to these pipes is preferably small, depending upon the size of the apparatus, say one quart more or less per minute. For complete flushing and cleaning out of the apparatus a larger supply should be available.

The apparatus as above described is complete in itself, but the drawing is used to illustrate an automatic visual indicator of the dial type, which may readily be added to the apparatus as already described by inserting a float 18 in each pipe 10 and 11, these floats being suspended by a flexible cord, wire or chain 19 by means of pulleys 20 mounted on a counter-weighted frame 21 which is suspended on pulley 22 by flexible cord, wire or chain 23 to which counterweight 24 is attached. From pulleys 20 the cord 19 is passed one and a half turns around grooved pulley 25.

The pulleys 22 and 25 are mounted upon fixed supports as shown by 26, 27 and 28, therefore if floats 18, 18 both rise or fall together, the movement is adjusted by rising or falling of the counter-weighted frame 21, pulley 25 not being affected by equal movement of the two floats 18, 18. If, however, the two floats 18, 18 move relatively to each other, one rising or falling more than the other, then this difference in movement will produce rotation of the pulley 25 moving a hand or pointer 30 attached to the shaft on which pulley 25 is mounted, the movement of the pointer showing by the graduations of the dial 29 the specific gravity of the fluid mass.

Rotation of the pulley 25, or movement of the cord 19, may be used to actuate the marking arm of registering recorders of types illustrated by Fig. IV and in common use, and thus a continuous and permanent record of variations in the specific gravity of the fluid mass can be obtained. The dial 29 may be equipped with electric contact points set at any desired specific gravity graduations as illustrated in Fig. IV so that the pointer 30 in passing over these points will complete an electric circuit and operate gongs or other forms of annunciators or alarms as also illustrated by Fig. IV.

In the drawing the indicator dial 29 and the fixed pulley 22 carrying the counter-weighted pulley frame 21 are mounted upon and vertically above the pipes 10 and 11, but these structures are not necessarily mounted in this position.

In Fig. IV, the tank 1, agitated fluid mass 2, and superposed water 3 and the composition and specific gravity of the fluid mass, and the depths of immersion of the tubes are as in Fig. III, the tubes in this case, 40 and 41 are closed at the top and are continuously supplied with compressed air through pipes 42, 43 which through the cylinder 44, pipes 45 and 46 and pipe 47 are in communication with a source of sufficient supply of low pressure compressed air maintained at a suitable and uniform pressure above the maximum pressure that may be needed to operate the apparatus. The flow of air from supply pipe 47 is controlled by valve 48 and the individual supply of air to tubes 40 and 41 is regulated by needle valves 49 and 50, these valves being so constructed that a small but continuous flow of air issues from the bottom of tubes 40 and 41 through a port in said valves that remains permanently open, the supply to each being regulated by the bubbles of air coming to the surface of the water at each tube. By this means the pressure on each side of the piston 51 is at all times equal to the pressures developed by the fluid mass at the depths of immersion.

The piston rod 52 has an extension rod or cord 53 attached to a spring 54 and carrying an indicator pointer 55 with marking pen or pencil in operative relation to the revolving cylinder recorder 56, and also carries a contactor arm 57 sliding on the contact strip 58 adapted to make contact with movable contact points 59 and 60 and thus actuate electric annunciators shown as gongs 61, 62. The operation of the apparatus will be understood without further description. The drawing illustrates means for rotating the rods to prevent the tubes becoming clogged as referred to in the description of Fig. III, the means shown comprising a gear 63 driving gears 64, 65 by which rods 66, 67 are slowly rotated, the gear 63 being driven through bevel gears 68, 69 by pulley 70 which is driven by any suitable source of power.

The rods 66, 67 are carried down through tubes 40, 41 in pipes 71, 72 open to the atmosphere at the top, and extending down to or slightly below the bottom of tubes 40, 41, so that fluid mass and water may enter and rise in these pipes, while its entrance into tubes 40, 41 is prevented by the presence of the compressed air. The rods 66, 67 carry annular plugs which extending up into tubes 40, 41 and being rotated by the rods 66, 67 prevent clogging of the tubes. These plugs and the enlargement at the lower end of rods 66, 67 are illustrated by Fig. IV$^a$ and IV$^b$, the rods 66, 67 having an enlargement 73 leaving small clearance between it and the inside of pipes 71, 72; attached to this enlargement 73 is an open grid 74 carrying the annular tube cleaner 75 between which and the inner wall of tubes 40, 41 and the outer wall of pipes 71, 72 there is but a small clearance. Rotation of the rods 66, 67 therefore produces rotation of tube cleaner 75 and thus prevents clogging and facilitates the discharge of materials that may have found their way into these tubes and also insures the free and unobstructed discharge of air from the bottom of tubes 40, 41. The open grid support or connection 74 also contributes to this end and also permits the pipes 71, 72 to fill with water and to discharge sand or other solid matter from said pipes. The described construction permits the apparatus to be built with the tubes 40, 41 absolutely air tight which would be difficult if the clean-out rods were taken through the top of these tubes through packing glands or any form of stuffing box. The pipes 71, 72 are shown projecting slightly below the bottom of tubes 40, 41.

Fig. V illustrates a construction in which the difference in pressures is directly measured and transmitted by flexible diaphragms at the base of the tubes 4, 5 which are both equipped with a flexible diaphragm 75 attached to a rod 76 operatively connected to a knife-edge 77 which is in contact with the lever 78 free to oscillate on knife-edge 79, the difference in pressure developed at the base of the tubes 4 and 5 reacting upon the spring 80, adjustable by screw 81, whereby the movements of the pointer 82 attached to lever 78, are proportional to said differences in pressure. The pointer arm 82 may of course be made to actuate the contacts of electric circuits connecting with control and annunciator system as already described.

The drawings are diagrammatic and the several parts are intended to represent equivalent devices performing like functions or producing like results. Many of the parts shown are exaggerated in order to show details plainly and for the same reason the necessary supports for the several elements are not shown.

I do not limit the application of my invention to the exact details or forms of construction and arrangement shown by the drawings and as herein described, as it is obvious that apparatus of many other kinds may be used without departing from the essential features of my invention as defined in the appended claims.

Having described my invention I claim,

1. A method for measuring the specific gravity of fluid masses which are maintained suspensions of comminuted solid matter in liquid, said solid matter having a specfic gravity greater than that of the liquid and being substantially insoluble therein, which consists in immersing two pressure gauges in said fluid mass, one of said gauges being immersed to a known greater vertical depth in said fluid mass than the other, in measuring the difference in pressure per unit of area at the two depths of immersion, and in dividing said difference by the weight per unit of area of a column of said liquid free from suspended solids and equal in height to said known vertical difference in depth.

2. A method for measuring the specific gravity of fluid masses which are maintained suspensions of comminuted solid matter in liquid, said solid matter having a specific gravity greater than that of the liquid and being substantially insoluble therein, which consists in immersing two pressure gauges in said fluid mass, one of said gauges being immersed to a known greater vertical depth in said fluid mass than the other, in measuring the difference in pressure per unit of area at the two depths of immersion, in which the two pressure gauges register the pressures by the height of columns of liquid and the specific gravity is determined by dividing the difference in height between said columns by said known vertical difference in depth and adding 1.00 to the result.

3. Apparatus for measuring the specific gravity of fluid masses which are maintained suspensions of comminuted solid matter in liquid, said solids having specific gravities greater than that of the liquid and being substantially insoluble therein, comprising in combination two pressure gauges adapted to be so immersed in such maintained suspension that one of said gauges will be immersed to a known greater vertical depth in said fluid mass than the other and means for measuring the differences in the pressures indicated by said gauges.

4. The apparatus of claim 3 in which the pressure gauges are manometer tubes.

5. The apparatus of claim 4 in which the means for measuring differences in pressure is a movable graduated scale whereby the specific gravity of the said maintained suspension is directly measured by said scale.

6. The apparatus of claim 5 in which floats are placed in said manometer tubes, said floats being operatively connected to an indicator whereby differential movements of the two floats with reference to each other are indicated.

Signed at Philadelphia, Pennsylvania, this 24th day of July, 1924.

THOMAS M. CHANCE.